Patented Jan. 27, 1953

2,626,535

UNITED STATES PATENT OFFICE 2,626,535

CLOTH INSPECTION APPARATUS

John J. Owen and Ralph W. Feil, Charlottesville, Va., assignors to Institute of Textile Technology Application February 23, 1949, Serial No. 77,916

4 Claims. (Cl. 88—14)

1

The present invention relates to apparatus for inspecting materials, and especially fabric materials, for detecting flaws, imperfections, and defects therein arising from any cause, either during or subsequently to the weaving of the fabric. The improvements of the present invention apply particularly to an inspection apparatus for inspecting continuously moving cloth fabrics, particularly such fabrics as are provided in strips of indefinite length, wherein the moving strip of fabric being inspected is enclosed in a light tight cabinet except for an inspection opening or a window which is accessible to an inspector stationed at an inspection station exterior of the cabinet. The improvements of the present invention reside in structural and optical features within the cabinet which cooperate to enable the inspector to scan expeditiously the continuously moving strip of cloth fabric through the aforesaid inspection window, the structural and optical features of the improved system cooperating to cause the continuously moving strip to appear to be stationary to the inspector so that eye fatigue will be minimized and the inspector can scan expeditiously the continuously moving fabric strip throughout its entire width and length, the apparent stationary image of the strip being presented to view as an unobstructed and uninterrupted field of vision.

The general concept of the invention may be grasped or understood more readily by a consideration of the following specifically noted objects of the invention, which are thought to be desirable to note particularly, although actually the invention is substantially more comprehensive than is expressed by the following particular objects.

The invention has for one of its objects the provision of a closed inspection cabinet wherein the strip of fabric or other material of indefinite length is moved continuously in a predetermined path through improved illuminating and optical environments which enable ready and accurate inspection of the material by an inspector located at a station exterior to the cabinet.

A further object of this invention is to provide a closed inspection cabinet of the above-indicated type wherein the illuminating and optical system employed in conjunction with a guide tract for the continuously moving material will result in the appearance to the inspector at the external inspection table of a stationary material rather than a continuously shifting area, although the fabric strip or similar material is maintained in continuous movement along the guided path or

2 track which the strip material is forced to follow.

Further objects and advantages of the present invention will become apparent as the description proceeds, and the features of novelty will be pointed out in particularity in the appended claims.

The invention will be better understood from a consideration of the following description in conjunction with the accompanying drawings, illustrating a preferred embodiment of the invention and in which Fig. 1 is a side elevation, partly in section, of a preferred form of apparatus embodying the invention;

Figure 1:
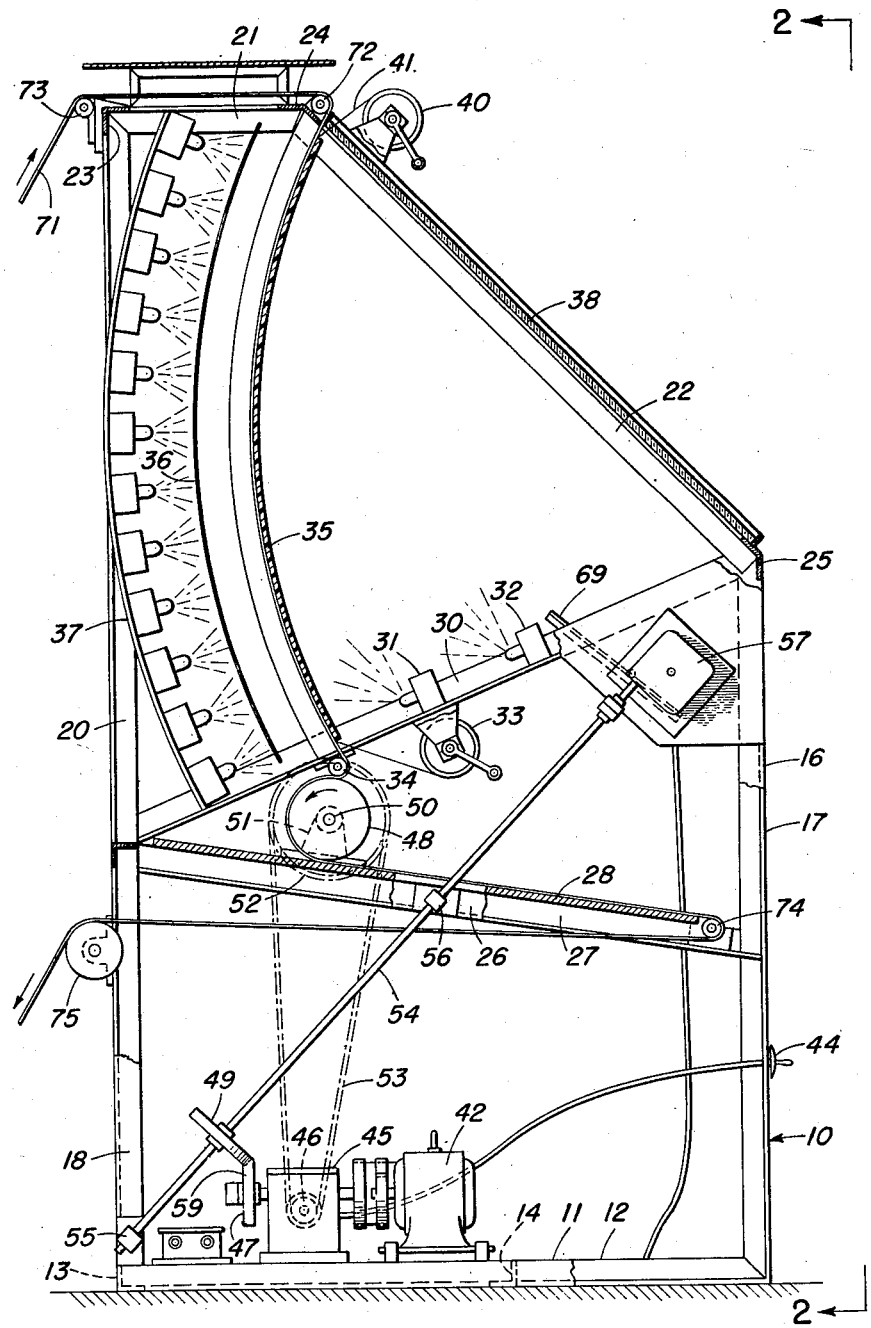

The apparatus shown in the drawings comprises a supporting frame 10 formed of structural steel elements welded together and forming a strong, rigid structure serving as the framework of a self-contained and portable cloth inspection unit. In the finished machine the upper portion of the machine is encased in suitable finishing material such, for example, as plywood or sheet metal.

The framework is a generally rectangular box-like structure having a portion of its top wall sloping downwardly to the front from a point intermediate the front and rear.

Figure 3:
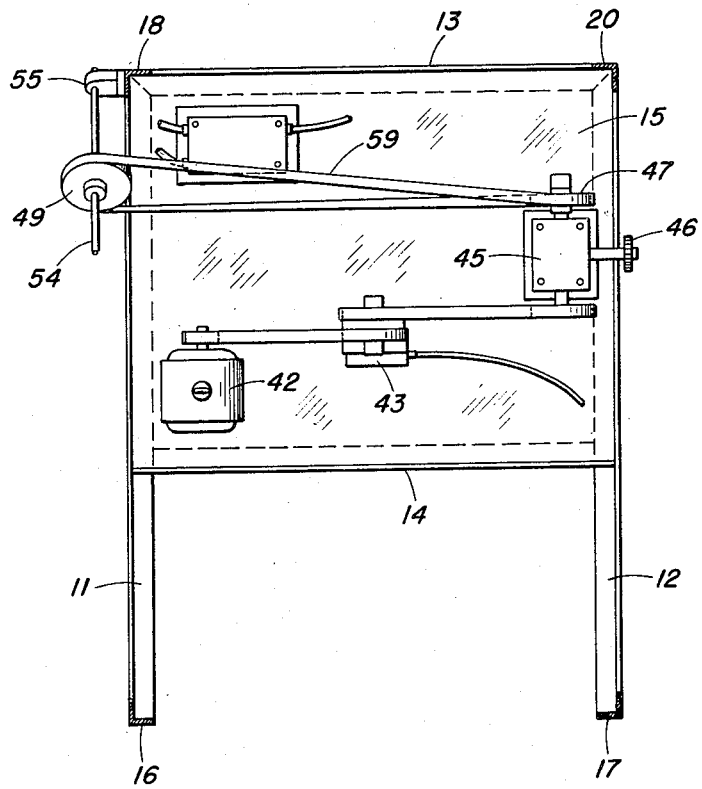
Fig. 3 is a transverse sectional plan view taken on the line 3—3 of Fig. 2, looking in the direction of the arrows, the view illustrating a layout of the driving means employed for operating the apparatus illustrated in Figs. 1 and 2.

The framework comprises a rectangular base open at the front (Fig. 3) and comprising side elements 11 and 12, a rear element 13, an intermediate transverse brace 14 and a base plate 15 for supporting power equipment disposed between the rear element and the transverse brace. Front vertically extending uprights 16 and 17 are welded to the front end portions of the side elements 11 and 12 of the base, and rear vertically extending uprights 18 and 20 are welded to the rear or back end portions of the side elements 11 and 12. The rear uprights 18 and 20 and the front uprights 16 and 17, which are shorter than the rear uprights, are joined by means of two horizontal elements 21 (only one of which is shown, Fig. 1) and two angularly disposed elements 22 (only one of which is shown, Fig. 1) extending downwardly toward the front. The front and rear uprights and the horizontal and angularly disposed elements are joined together by means of transverse braces 23, 24 and 25.

Metal braces 26 and 27 extending and sloping downwardly from the rear uprights to the front uprights are welded to the uprights and provide the supporting framework of a burling table 28.

Metal braces (only one of which, 30, is shown) extending and sloping upwardly from the rear uprights to the front uprights are welded to the uprights and provide supporting means for various elements of the apparatus, including front lights 31 and 32, a winding reel 33 for thin, flexible transparent material such as "cellophane" 41, a cloth guide roller 34, a curved, transparent, stationary cloth guide 35, a curved translucent light shield, filter or dispersing medium 36 and a bank of back lights 37.

A stationary mirror 38 is supported by the angularly disposed top wall of the framework of the apparatus with its reflecting surface facing inwardly and downwardly. A winding reel 40, similar to and in functional cooperation with winding reel 33, also is mounted on and supported by the angularly disposed top wall of the apparatus.

The transparent, curved stationary cloth guide may be formed of any suitable transparent material, and it preferably is slightly wider than the maximum width of any strip of cloth for the inspection of which the apparatus might be required. Preferably, the transparent, stationary, curved cloth guide is formed of a suitable plastic material such, for example, as methyl methacrylate resin sold under the trade name "Lucite." The curvature of the transparent, stationary, curved guide preferably is that of an arc of a circle. A thin, flexible strip of relatively inexpensive transparent material 41 of about the same width as the transparent curved guide may be provided for protecting the convex surface of the curved guide against abrasion. Such a protective strip may be manipulated between the winding reels 33 and 40 to maintain a suitably unimpaired section or portion in contact with the curved stationary guide.

The shield or filter 36 may be formed of any suitable material. It preferably is formed of a translucent sheet of clouded, white plastic material, and it preferably is of the same curvature as the stationary, transparent curved guide. The shield or filter 36 preferably is sufficiently wide and long and so disposed as to shield the curved guide and cloth passing over the curved guide against the direct rays of the lights of the bank of lights 37.

The front lights 31 and 32 and the lights of the bank of back lights 37 preferably are fluorescent daylight tubes.

The apparatus is powered by an electric motor 42, driving through a variable speed transmission 43 (of known construction) remotely controlled through a handwheel 44 located at the front of the apparatus. The variable speed transmission is operatively connected with a gear box 45 through which are driven a gear 46 forming part of a cloth driving mechanism and a pulley 47 forming part of a cam driving mechanism.

The cloth driving mechanism comprises a roller 48 fixed on a shaft 50 supported in bearings carried by brackets 51 mounted on the transverse brace 26 at either side. The roller 48 is driven by a gear 52 rigidly mounted on the shaft 50 and operatively connected to the driving gear 46 by means of a driving chain 53. The rollers 48 and 34 are so mounted as to co-operate in moving cloth passing over the convex surface of the stationary guide 35, and the roller 48 is spaced above the surface of the burling table a distance sufficient to permit passage of cloth therebetween.

The cam driving mechanism comprises an angularly disposed shaft 54 supported in bearings 55 and 56 mounted on the rear frame upright 18 and transverse brace 26 and operatively connected with an irreversible, single reduction, worm gear box 57 (of known construction). The worm gear assembly 57 is, in turn, operatively connected with a cam 58 (Fig. 5) disposed within the apparatus in operative relationship to a bell crank lever 60 rigidly mounted on a shaft 61 extending between the side walls of the apparatus and suitably supported in bearings within the apparatus for rotation about a fixed axis parallel to the axis of the cylinder of which the curved, transparent cloth guide forms a part. The bell crank lever is provided at one end with a rotatable cam follower 62 and at the other end with a pin 63 which is attached to an anchored helical tension spring 64. The tension spring is anchored by means of an eye bolt 65 extending through an aperture in a fixed supporting element 66. Nuts 67 and 68 mounted on the eye bolt 65 provide means for adjusting the tension of the spring 64. The angularly disposed shaft is provided with a driving pulley 49 which is operatively connected with the pulley 47 by means of a V-belt 59.

Figure 5:
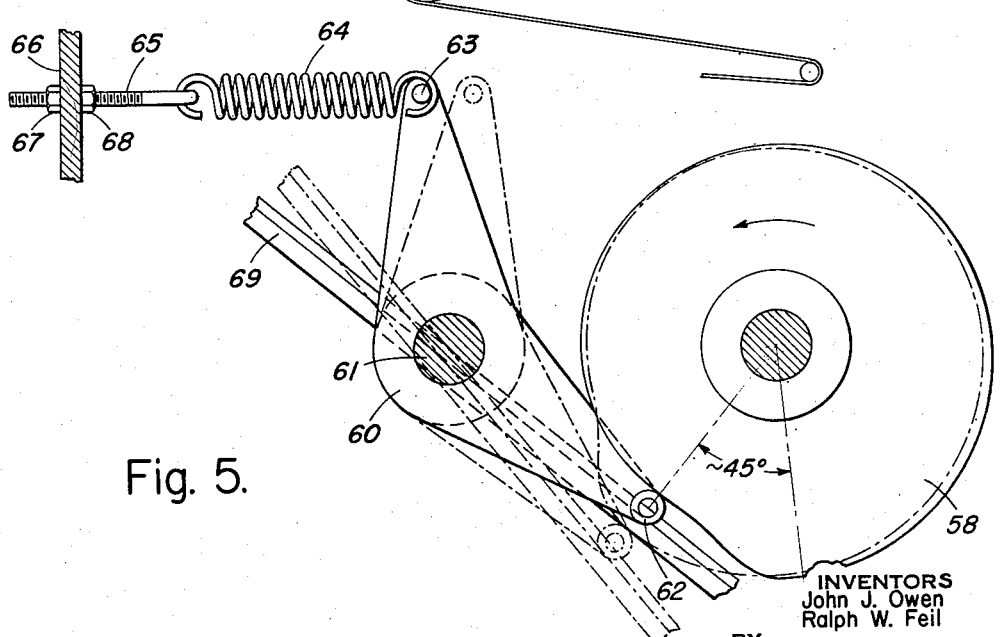
Fig. 5 is an elevation of the mirror drive mechanism employed in the apparatus illustrated in Figs. 1, 2 and 4.

A relatively small mirror 69 is so mounted on the shaft supporting the bell crank lever that the axis of the shaft lies in and forms an element of the reflecting surface of the mirror. So mounted, the mirror is constrained to oscillate about an axis which coincides with the axis of rotation of the bell crank lever supporting shaft when the bell crank lever is actuated through the action of the cam 58, the cam follower 62 and the tension spring 64. Fig. 5 shows the mirror 69 in two extreme positions in its path of oscillation, one being shown in dotted lines and the other being shown in solid lines.

Figure 2:
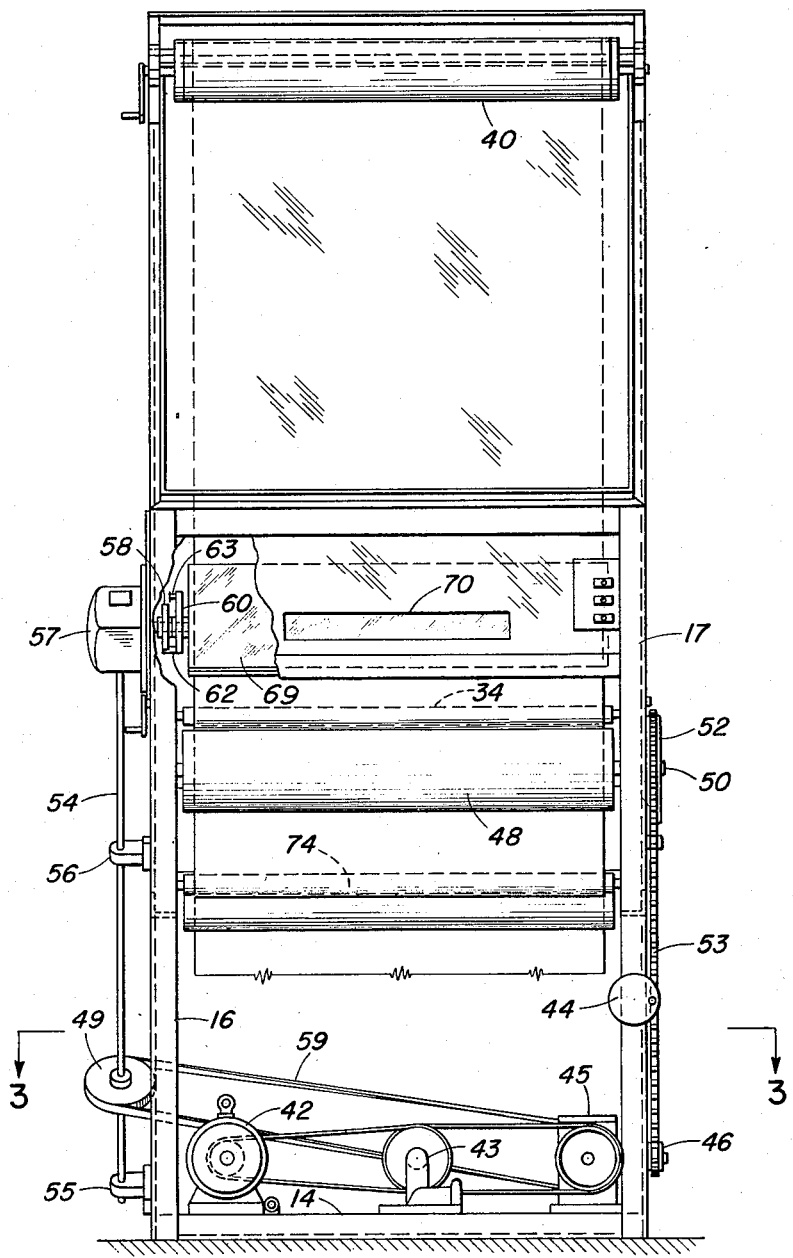
Fig. 2 is a front elevation of the apparatus shown in Fig. 1, the view being taken on the plane of the line 2—2 of Fig. 1, looking in the direction of the arrows.

The oscillating mirror is disposed in front of a rectangular opening 70 in the front wall of the apparatus (Fig. 2) which serves as an observation station.

In the operation of the device, cloth 71 to be inspected is passed over guide rollers 72 and 73 which may be supported in any suitable manner at the top of the apparatus and into contact with the convex surface of the curved, transparent guide 35 or into contact with a flexible transparent film covering the curved guide for protective purposes. Travel of the cloth is effected and maintained by means of the driving roller 48 and the motor, gear, chain and other driving means associated therewith. The cloth passes downwardly over the curved guide, between the rollers 34 and 48, around the roller 48, forwardly over the burling table, and rearwardly over guide rollers 74 and 75 disposed at the front and rear of the apparatus, respectively. Any suitable means may be provided for supplying the cloth for inspection and for withdrawing cloth from the apparatus after inspection.

As the cloth passes over the curved transparent guides, it is illuminated by the front and rear lights 31 and 32 and 37. The front lights also are arranged to illuminate the cloth as it passes over the burling table to facilitate use of the burling tools by the inspector when necessary.

Figure 4:
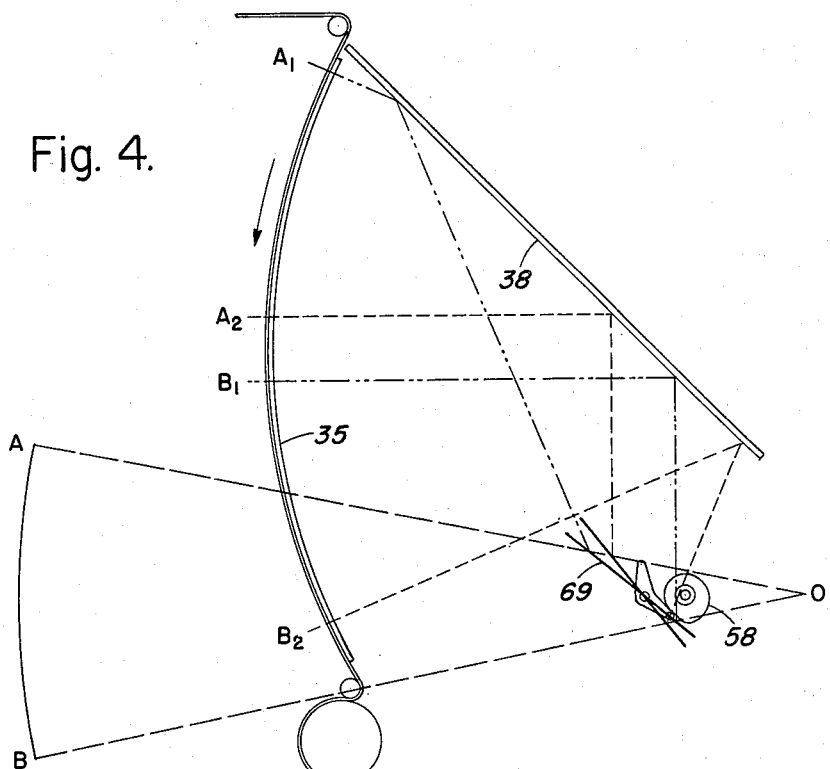
Fig. 4 is a schematic diagram of the optical system employed in the apparatus illustrated in Figs. 1 and 2.

The mirrors 38 and 69 are so disposed that light rays received from the cloth passing over the curved support by the angularly disposed fixed mirror 38 and reflected by that mirror are received by the oscillating mirror 69. The motion of the oscillating mirror is synchronized with the motion or travel of the cloth and the cam and a bell crank lever actions are so controlled that a series of virtual images is formed as illustrated diagrammatically in Fig. 4. Synchronization of cloth and mirror drives to produce a stationary image during tracking is obtained by means of variable pitch pulleys 47 and 49 (of known construction). These pulleys permit variation of the speed ratio between shaft 54 and input shaft of gear box 45 without changing the center distance between the shafts or the length of V-belt 59.

If desired, provision may be made for producing real images, as, for example, by providing a lens and a viewing screen.

We claim:

1. Apparatus for inspecting moving strips of light-transmitting material, which comprises the combination with a housing defining an inspection cabinet having an exterior observation station, the cabinet having a closed upper section and a base section open at the front thereof, the upper section including an angularly disposed top wall, a stationary mirror mounted on the said angularly disposed top wall having its reflecting surface facing inwardly and downwardly, transparent arcuate guide means rearwardly disposed in the upper section of the cabinet facing the reflecting surface of the fixed mirror, the arcuate guide means being engaged by the strip being inspected for guiding the strip in an arcuate path past the observation station, a series of light sources adapted to uniformly illuminate the strip material as it passes along the arcuate path, the light source being spaced rearwardly and concentrically relative to the transparent arcuate guide means, an arcuate light-diffusing member spaced in advance of the light sources and substantially concentrically disposed relative to the transparent guide means, an abrasion-protecting flexible transparent sheet engaging the transparent guide means intermediate the strip material and the guide means, cooperating actuating sheaves for the abrasion-protecting sheet, one of the said sheaves being mounted adjacent to the top of the cabinet, the other of the said sheaves being adjacent to the bottom of the top section of the cabinet, the said sheaves being adapted to sustain the protecting sheet in a radial path against the transparent arcuate guide means, actuating means for moving the protecting sheet against the transparent arcuate guide means and the strip material being inspected, driving means for moving the strip material against the transparent guide means and over a supporting means in the lower section of the cabinet, the said fixed mirror reflecting an image of the illuminated strip material to a viewing observer in front of the open front of the cabinet, the said strip material being illuminated by transmitted light passing through the light-diffusing member, thence through the transparent protecting sheet, the strip material, and the transparent guide means, an oscillating mirror positioned relative to the fixed mirror for receiving light rays from the fixed mirror and reflecting the said received light rays to the viewer in front of the opening in the cabinet, actuating means for oscillating the oscillating mirror, and control means for synchronizing movements of the oscillating mirror and strip material for producing a stationary image of the moving strip material to view of the observer.

2. Apparatus for inspecting moving strips of fabric material, which comprises the combination with a housing defining an inspection cabinet having a closed upper section and a base section defining a viewing opening in the front thereof, the upper section including an angularly disposed top wall, a stationary mirror mounted on the said top wall having its reflecting surface facing inwardly and downwardly, transparent arcuate guide means having a concave surface facing the said mirror and a rearwardly directed convex surface, a series of light sources mounted behind the convex surface of the arcuate guide means, an arcuate light-diffusing member interposed between the light sources and the said arcuate guide means and concentric with the said guide means, the said light sources being mounted on an arc concentric with the guide means and the light-diffusing member for equal illumination thereof, a flexible transparent abrasion-protecting sheet between the guide means and the light diffusing member, the said sheet having one surface engaging with the convex surface of the guide means and another source intermediate the said surface and the light-diffusing member and concentric therewith, means for moving the transparent protecting sheet relative to the arcuate guide means, means for moving the fabric strip being inspected in contact with the guide means and protecting sheet, the said light sources uniformly illuminating the fabric strip by transmitted light for an observer stationed at the inspection opening, additional light sources illuminating the strip by reflected light through terminal portions of travel thereof, an oscillating mirror positioned relative to the fixed mirror for receiving light rays reflected from the fixed mirror and for reflecting the light rays to an observer at the inspection opening, oscillating mechanism for oscillating the said oscillating mirror, means for synchronizing the oscillations of the oscillating mirror and the speed of travel of the fabric strip material being inspected for producing a stationary image of the moving fabric strip to view of the observer, a common source of power for the fabric strip-moving means and for the oscillating mechanism for the oscillating mirror, and separate driving means interconnecting the common source of power with the fabric strip moving means and the common source of power and the mirror-oscillating mechanism.

3. Apparatus for inspecting strips of fabric material, which comprises, in combination, an inspection cabinet completely enclosed except for an observation window for enabling an inspector at a station exterior of the cabinet to view the interior of the cabinet, an arcuate transparent guide plate in the cabinet having a front concave side facing the observation window and being on a circular arc with the said window as center, the said arcuate guide member having a rear convex surface, a transparent sheet overlying the convex surface of the guide member for protecting the latter against abrasion, means for moving the transparent protective sheet relative to the guide member, means for feeding a fabric strip to be inspected along the protective sheet which is interposed between the fabric strip and the guide member, illuminating means positioned rearwardly of the fabric strip and guide member and concentric therewith for enabling inspection of the moving fabric strip by transmitted light, additional illuminating means facing the guide member for illuminating a selected portion of the strip by direct illumination, a stationary mirror receiving transmitted light from the fabric strip and guide means, and an oscillating mirror cooperating with the stationary mirror by receiving light reflected therefrom and reflecting such light through the inspection window, and oscillating mechanism for the oscillating mirror for oscillating the oscillating mirror in timed synchronism with the rate of movement of the fabric strip for producing an apparently stationary image for the observer of that portion of the fabric strip that is directly illuminated.

4. Apparatus for inspecting strips of fabric material, which comprises, in combination, an inspection cabinet completely enclosed except for an observation window for enabling an inspector at an inspection station exterior of the cabinet to view the interior of the cabinet, the interior of the cabinet including an upper portion and a lower portion, an arcuate transparent guide plate in the upper portion of the cabinet and extending vertically therethrough and being on a circular arc with the said window as center, the said guide plate having a forwardly disposed concave surface and a rearwardly disposed convex surface, a transparent sheet overlying the convex surface of the guide plate for protecting the guide plate against abrasion, the said protecting transparent sheet being an endless transparent strip approximately coextensive with the guide plate, spaced guide rollers for the protecting sheet guiding one course along the guide plate while retaining a second course spaced from the transparent plate and in an arc concentric with the arc of the transparent guide plate, a light-diffusing plate spaced rearwardly of the protecting sheet and concentric relative thereto, a plurality of light sources disposed rearwardly of the light-diffusing plate, means for supporting and for moving a fabric strip to be inspected along the convex surface of the guide plate in engagement with the protecting sheet, driving means for the fabric strip in the lower portion of the cabinet, cooperating reflecting means including a stationary mirror and an oscillating mirror for reflecting light from the light sources to the observation window, operating means for the oscillating mirror effecting oscillation of the oscillating mirror in timed synchronism with the speed of movement of the fabric strip along the guide plate for producing an apparently stationary image of the moving fabric strip to view of an inspector at the inspection window, a burling table mounted in the lower portion of the cabinet for receiving the moving fabric strip directly from the arcuate guide plate, a common source of power for the mirror-oscillating operating means and for continuously moving the fabric strip along the guide plate and over the burling table, and separate power take-off means for operating the fabric strip and the mirror-oscillating means.

JOHN J. OWEN.
RALPH W. FEIL.

REFERENCES CITED

The following references are of record in the file of this patent:

UNITED STATES PATENTS

| Number | Name | Date |
|---|---|---|
| 1,446,495 | Brenner | Feb. 27, 1923 |
| 1,489,510 | Stromberg | Apr. 8, 1924 |
| 1,930,077 | Bentley | Oct. 10, 1933 |
| 2,022,487 | Boaz | Nov. 26, 1935 |
| 2,105,715 | Birch | Jan. 18, 1938 |
| 2,124,802 | Wallace | July 26, 1938 |
| 2,155,013 | Horton | Apr. 18, 1939 |
| 2,214,500 | Fischer | Sept. 10, 1940 |
| 2,381,997 | Bolsey | Aug. 14, 1945 |

FOREIGN PATENTS

| Number | Country | Date |
|---|---|---|
| 453,985 | Great Britain | Sept. 22, 1936 |